US00RE40158E

(19) United States
(12) Reissued Patent
Weitgasser

(10) Patent Number: US RE40,158 E
(45) Date of Reissued Patent: Mar. 25, 2008

(54) WALL LIGHT

(75) Inventor: Erwin Weitgasser, Salzburg (AT)

(73) Assignee: Derungs Licht AG, Gossau (CH)

(21) Appl. No.: 29/259,363

(22) Filed: Apr. 14, 2004

Related U.S. Patent Documents

Reissue of:
(64) Patent No.: Des. 472,007
Issued: Mar. 18, 2003
Appl. No.: 29/160,317
Filed: May 9, 2002

(30) Foreign Application Priority Data

Nov. 12, 2001 (WO) ..... DM/058 476

(51) LOC (8) Cl. ..... 26-03
(52) U.S. Cl. ..... D26/76; D26/72
(58) Field of Classification Search ..... D26/72, D26/75–79; 362/217–225
See application file for complete search history.

(56) References Cited

U.S. PATENT DOCUMENTS

D125,468 S * 2/1941 Dreyfuss ..... D26/75
D139,670 S * 12/1944 Lippincott ..... D26/76
2,715,449 A * 8/1955 Lemmerman et al. ..... 362/217
D414,580 S * 9/1999 Herst ..... D26/76

FOREIGN PATENT DOCUMENTS

CH 112501 8/1982
CH 114070 11/1984
CH 126592 1/2000

OTHER PUBLICATIONS

Fluora Tecno–X; Direkt/Indirekt–Leuchten für T5 Fluoreszenzlampen, ø 16 mm; Fluora Leuchten AG; pp. 28–31.

* cited by examiner

*Primary Examiner*—Clare E Heflin
(74) *Attorney, Agent, or Firm*—Shoemaker and Mattare

(57) CLAIM

The ornamental design for a wall light, as shown and described.

DESCRIPTION

1 Claim, 2 Drawing Sheets

Figure 1:
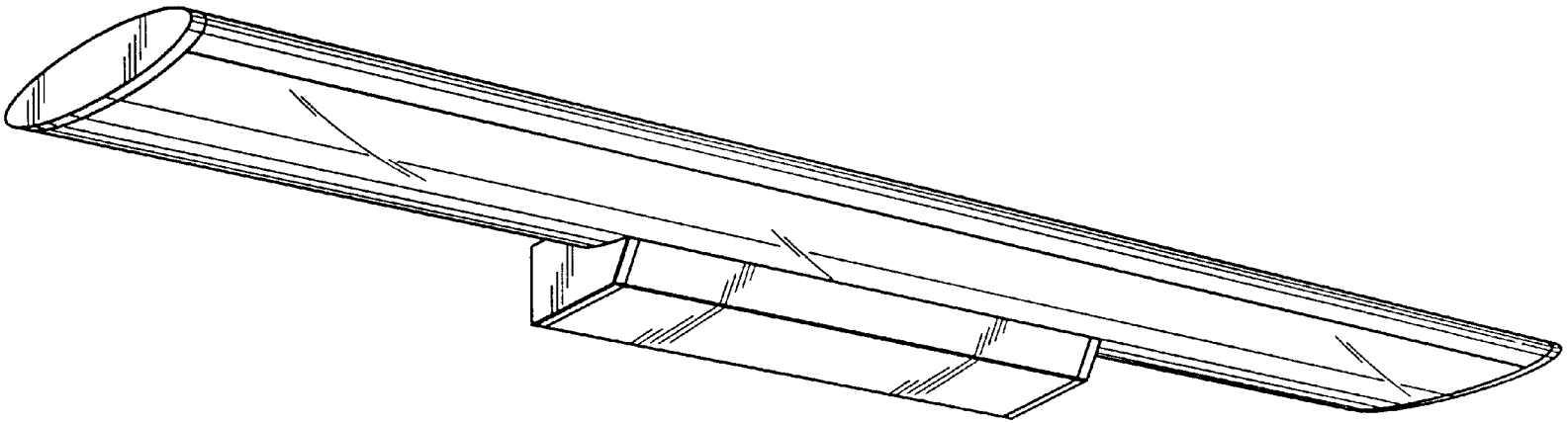
FIG. 1 is a perspective view of a light, viewed from the front, left side and bottom, showing my new design.
Figure 2:
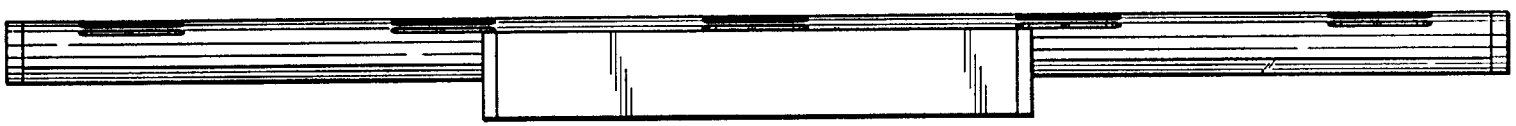
FIG. 2 is a rear elevation thereof.
Figure 3:
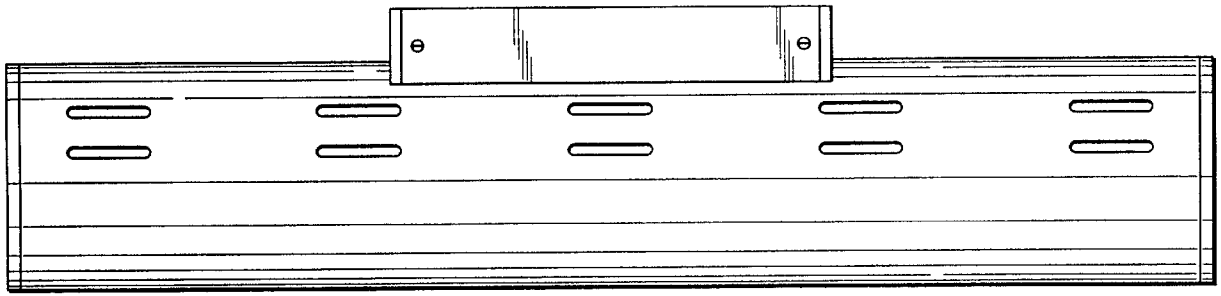
FIG. 3 is a top plan view thereof.
Figure 4:
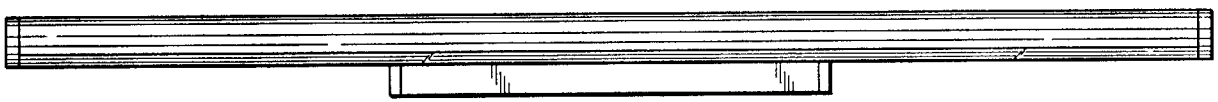
FIG. 4 is a front elevation thereof.
Figure 5:
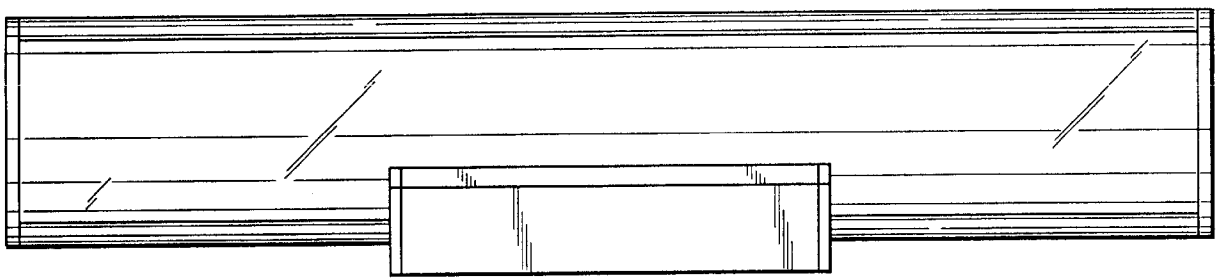
FIG. 5 is a bottom plan view thereof.
Figure 6:
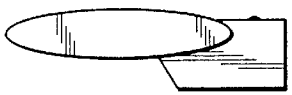
FIG. 6 is a right side elevation thereof, the left side elevation being a mirror image.

Matter enclosed in heavy brackets [ ] appears in the original patent, but forms no part of this reissue; matter printed in italics indicates the additions made by reissue.